Fig. 6

United States Patent Office 3,507,719
Patented Apr. 21, 1970

3,507,719
EXTRUDABLE SOLID PROPELLANT COMPOSITION CONTAINING METALLIC FUEL PARTICLES AND OXIDIZER PARTICLES DISPERSED IN A WAXY BINDER
James E. Hodgson, Cleveland, Ohio, assignor to Solid Fuels Corporation, Cleveland, Ohio, a corporation of Ohio
Original application Nov. 2, 1959, Ser. No. 850,489, now Patent No. 3,388,554, dated June 18, 1968. Divided and this application Mar. 28, 1968, Ser. No. 772,871
Int. Cl. C06d 5/00
U.S. Cl. 149—6      2 Claims

ABSTRACT OF THE DISCLOSURE

The invention relates to an extrudable solid propellant composition in which metal-containing fuel particles and oxidizer particles are dispersed in a low melting waxy material. The dispersed oxidizer particles alone can be coated with a plastic film or both the dispersed oxidizer and fuel particles can be coated with a plastic film.

---

This application is a division of application Ser. No. 850,489, now U.S. Patent 3,388,554.

The present invention relates to a solid or semi-solid fuel and a method and apparatus for utilizing the same for propulsion. More particularly, the present invention relates to a solid or semi-solid fuel and a method of burning a solid or semi-solid fuel for rocket, ram-jet, and torpedo propulsion applications in which said fuel preferably is injected or extruded into a combustion chamber, and burned therein with oxygen or fluorine or other well known oxidizers and even steam to provide an improved means of propelling a vehicle.

In the past, propulsion systems have been used in which a metal fuel such as aluminum powder was suspended in gasoline, kerosene or other organic liquids to form slurries for burning with liquid oxygen or fluorine in a combustion chamber. Such systems have suffered from the drawback of having the aluminum particles separate out from the kerosene even when large amounts of a stabilizer such as Napalm type gelling agent were added.

Further, the addition of the Napalm type gelling agent is undesirable because the resultant gels are not as stable as desired and generally must be formed at the site shortly before using the same. The Napalm type gels also provide the fuel with an energy penalty inasmuch as the metal sodium does not add to the total energy obtained from combustion of the fuel.

While metal fuels such as aluminum and lithium powders suspended in kerosene are readily burned with liquid oxygen or fluorine containing combustion agents such as chlorine trifluoride, they suffer from further disadvantage that the suspended metal (or metalloid) particles separate and clog the equipment and complicate the plumbing required in a vehicle such as a liquid fueled rocket.

It is therefore an object of the present invention to provide a solid fuel which is adapted to be extruded and burned with a combustion agent such as oxygen or fluorine and which fuel comprises finely divided metal or metalloid fuel particles that are held in a stable suspension and burn with a specific impulse in the neighborhood of 250 or more.

It is an object of the present invention to provide a binder for metal or metalloid particles in a solid fuel so that the binder-fuel mixture can be melted and subsequently extruded by or otherwise injected by pump, piston, or other means into a combustion chamber of a vehicle such as a jet engine, a ram-jet engine or a rocket engine.

It is an object of the present invention to provide a solid fuel in which metal or metalloid particles are bound within a matrix of a low melting waxy material which is easily fused for extrusion into a combustion chamber.

It is an object of the present invention to provide an improved method of burning a solid fuel having finely divided exotic metal or metalloid particles by melting said fuel and extruding the same into a combustion chamber for reaction with a combustion agent such as oxygen or fluorine.

It is an object to provide a system for burning fuels for propulsion in which the apparatus used includes means for extruding a melted solid fuel into a combustion chamber, and means for reacting said fuel with a material such as oxygen to combine chemically with said fuel to obtain a relatively large amount of energy therefrom.

It is an object to provide a solid fuel and a method of utilizing the same in which the fuel is extruded into a chamber, vaporized, and superheated to provide energy for propulsion.

Other objects will be apparent from the description that follows, the appended claims and the drawings in which:

FIG. 9 shows a cross sectional view of a nuclear chemical hybrid rocket engine in which the semi-solid fuel is utilized in a fusing and feeding system therefor, the fuel being vaporized in the reactor and then further chemically burned with a liquid oxidizer in the combustion chamber in the usual way before being expelled at the nozzle to produce thrust.

It has been found that a solid or semi-solid fuel comprising finely divided metal and/or metalloid particles bound within a matrix of a low melting fusible waxy material can be used in a rocket, ram-jet, and torpedo engines systems for propulsion without the disadvantage of having the metal particles settle out of suspension as is the case for example when aluminum or lithium particles are suspended in kerosene. The solid fuel of the present invention, in which a low melting waxy material is employed as a binder, provides a high energy fuel that may be extruded and burned in a combustion chamber with oxygen or fluorine to provide a fuel and oxidizer combination having an excellent specific impulse and being easier controlled than propellant systems in which the fuel is a slurry of metal particles suspended in kerosene.

It has been found that the melting point of the waxy binder material is of importance. In this respect, generally the melting point may be as low as about 30° C. to 40° C. and it may be as high as 120° or even 125° C. to still obtain benefits of the present invention. It has been found that when the melting point is increased much over 125° C., the resultant fuel material is not readily extrudable and generally not easy enough to handle to provide any advantage in a propellant burning system where a large amount of high energy metal or metalloid fuel is used.

While waxes in the above melting range may be used, by far the best results have been obtained with low melting fusible waxy material having a melting point of about 80° C. to 110° C. Of these materials, petroleum jelly has been outstanding. Other preferred waxy binders are paraffin wax, naphthalene, bees wax, and certain low melting polyethylenes, namely, those having a molecular weight from about 4000 to about 8000, as well as a low melting point of less than 120° C. Some benefits are provided with low melting polymers of halogen-substituted (preferably fluorine) and nitro-substituted ethylenes such as polytetrafluorethylene or polyfluoro-nitro-ethylenes of low molecular weight and melting point. In the case of the fluoro-substituted hydrocarbons, of which polytetrafluoroethylene is preferred, or the nitro substituted hydrocarbon; an additional burning advantage is obtained from the fluorine and/or nitro-content.

Other suitable waxy materials for use as a binder to suspend solid particles in a stable homogeneous manner are stearic acid, beta-naphthol, solid coconut oil, triphenyl methane, octadecane and a low molecular weight (about 3000 to 7000) polyalpha-methyl styrene having a melting point of about 80 to 120° C. As to the melting points of some of the materials mentioned above, naphthalene has a melting point of 80° C., beta-naphthol has a melting point of 122° C., stearic acid 70° C., triphenylmethane 93° C., and octadecane 28° centigrade.

In accordance with the present invention there has been found that the waxy materials should have a structure capable of keeping metals in stable suspension and therefore should be a wax with a solid continuous phase and having no liquid entrapped therein in a discontinuous phase such as may be the case of a suspending agent of the Napalm type.

In accordance with the present invention, it is further important that the waxy material have only carbon atoms, hydrogen atoms, and atoms having atomic weights of about 14 to 19 including oxygen, nitrogen and fluorine. As previously indicated, the presence of atoms such as sodium provide a burning penalty. Thus, the preferred waxy materials consist essentially of only carbon and hydrogen atoms although good results are also obtained when they also contain oxygen atoms and/or nitrogen atoms.

In accordance with the above discussion, by far the best results are obtained by low melting waxy materials in which the melting point is not greater than 100° C., and in any event, not substantially greater than 120° C., and in which the waxy material has only carbon atoms, hydrogen atoms, and atoms having atomic weights between about 14 and about 19.

It has also been found that the percent by weight of binder used based on the total weight of fuel should be generally about 5 to 65 percent. The preferred range is about 20 to 40 percent by weight and, generally, as in the case of the preferred binders-petroleum jelly and paraffin wax—the best results are obtained when the binder comprises about 25 to 35 percent by weight of the total fuel.

The metal fuel particles which are bound up with the waxy material according to the present invention may comprise high heat releasing, exotic metal and metalloids particles such as magnesium, titanium, lithium, aluminum, boron, beryllium, and their carbides borides and hydrides such as decaborane, aluminum hydride, lithium hydride, beryllium hydride, lithium borohydride, lithium aluminum hydride, beryllium carbide, lithium carbide, aluminum carbide, boron carbide, silicon carbide, aluminum boride, etc. In the present description and in the claims the term metal containing fuel particles is intended to embrace both metal and metalloid particles.

In accordance with the present invention, the metal containing fuel particles may advantageously comprise about 35 to 95 percent by weight of the fuel and preferably comprise 60 to 80 percent by weight of the fuel, the balance being a low melting binder such as petroleum jelly, paraffin wax or mixtures thereof.

The solid fuel may also contain an ignition sensitizer or a combustion conditioning agent, or both. The ignition senstizing agents improve the ease of ignition of the propellant while the combustion conditioning agents promote more rapid, even combustion by dispersing the fuel particles into the oxidizer stream to give good mixing and rapid flame spreading and combustion.

Suitable sensitizer and conditioning agents of the fuel type are decaborane, lithium hydride, phosphorous, lithium, and hydrides of aluminum, boron, etc. The ignition sensitizer or combustion agent component of this oxygen containing type may be R.D.X. (trinitrotrimethylenetriamine), or penta erythritol tetranitrate or any solid nitrate, chlorate, perchlorate (both inorganic and organic) or any solid nitro or perchloro compounds such as ammonium nitrate, ammonium perchlorate, hydroxylamine nitrate, hydrazine nitrate, hydrazine dinitrate, hydrazine perchlorate, trinitro toluene, picric acid, lithium nitrate, lithium chlorate, lithium perchlorate, nitro starches, nitro cellulose, nitro guanidine, urea nitrate, quaternary amine perchlorate, guanidine perchlorate, erythritol tetranitrate, nitro glycerine etc.

Some of the above listed sensitizers and combustion agents may be used as all or part of the fuels. Those which are suitable as fuels include hydrides of aluminum, boron and preferably lithium. Ammonium nitrate; urea nitrate; nitro starches nitro guanidine; and nitro cellulose can be incorporated in useful amounts as combined fuel-oxygen sources. Most of the other combustion promotion and flame spreading agents are too explosive and hazardous to use as fuels, but the above named low energy oxidizers and fuels may be used as the only contents of propellants which are extruded and burned as auxiliary power supply sources, as long as the extrusion rate is greater than the burning rate.

When the third component—the ignition sensitizing agent or the combustion condition agent—is used, the amount of said agents used is dependent somewhat upon where the propellant composition will be used. The best results in rocket and ram-jet engine performances are obtained when the above oxygen containing agents are used from about ½% or 1% up to about 10 by weight of the fuel plus binder. However, for rocket propellants which must carry oxygen in some form, good results may be obtained when as high as 10 to 15% by weight of the fuels are used. When using an explosive material such as trinitrotrimethylenetriamine generally 10 percent is a maximum amount even in rocket propellants especially when hydrides of boron, aluminum and lithium are used, or even ammonium nitrate, and other oxidizers. Up to 60 percent of some oxidizers by weight of the total fuel and binder weight may be used in some cases when combustion resistant fuels such as boron, boron carbide are incorporated.

Excellent solid fuels, which may contain a combustion conditioning agent or a sensitizer, may be made according to the following formulation:

| Ingredients: | Parts by weight |
|---|---|
| Organic waxy binder | 10–60 |
| Metal or metalloid particles (generally 100 to 425 mesh such as 325 mesh boron powder) | 40–90 |
| Combustion conditioning agent such as penta erythritol tetranitrate or R.D.X. (sym-trimethylene trinitriamine) | 0–20 |

It has been found that oxidizer particles that would ordinarily react prematurely with metal or metalloid fuel particles such as lithium perchlorate and lithium hydride particles, unexpectedly can be safely placed in close proximity to metal hydride particles when said oxidizer and/or fuel particles are coated with a thin polymerized resin film such as a film of epoxy resin. The resin film prevents premature reaction of the oxidizer particles with moisture or metal hydride particles so that even 2 or 3 times as much oxidizer as would ordinarily be tolerated can be added in its coated form. While oxidizer particles alone may be covered with a plastic film, when certain fuels are used such as lithium hydride with lithium perchlorate, both fuel and oxidizer particles should be coated.

Figure 1:
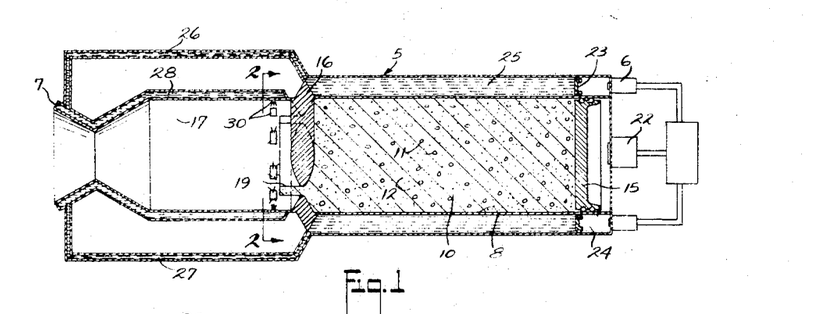
FIG. 1 is a diagrammatic drawing illustrating one embodiment of the present invention in which a cross section of a rocket engine and propellant system is shown containing an improved solid fuel.

As previously discussed the low melting solid fuel compositions of the present invention may be used advantageously in a variety of propulsion systems. As shown in FIG. 1, the wax-bound solid fuels are adaptable for use in a rocket engine. FIG. 1 shows a rocket 5 having a forward portion 6 and a rear exhaust portion 7. The forward portion 6 includes chamber 8 containing a solid fuel 10 having a plurality of metal fuel particles 11 uniformly disposed within a low melting waxy binder 12 which is preferably petroleum jelly. The fuel 10 is extruded by piston 15 through a die 16 into a combustion chamber 17 where it is burned with perchloryl fluoride to provide a high heat and energy release at a slow enough rate to be effectively utilized in propelling the rocket 5.

In accordance with the present invention, the improved solid fuel is easily extruded into the combustion chamber to form a relatively thin sleeve 19 which provides a high surface area for combustion of the fuel. Throughout the extrusion step, the metal containing fuel particles remain uniformly dispersed for more even burning.

The piston 15 is forced against the fuel slug by a burning propellant charge 22 which can be cordite, a smokeless powder which is a mixture of nitrocellulose and nitroglycerin or other monopropellant. The propellant 22 causes pressure to be exerted against the piston 15 as well as pistons 23 and 24 which in turn pressurize a liquid combustion agent 25, ClO$_3$F (perchloryl fluoride). The ClO$_3$F is stored in an annular chamber around the fuel chamber and conducted to the combustion chamber by conduits 26 and 27 into a cooling jacket 28 which is located around the combustion chamber. The liquid ClO$_3$F is injected into the combustion chamber through series of slits 30, which as shown in FIG. 2, are radially disposed around the inner periphery of the combustion chamber near the entrance of the extruded sleeve 19 of the wax-bound fuel.

Figures 2, 3:
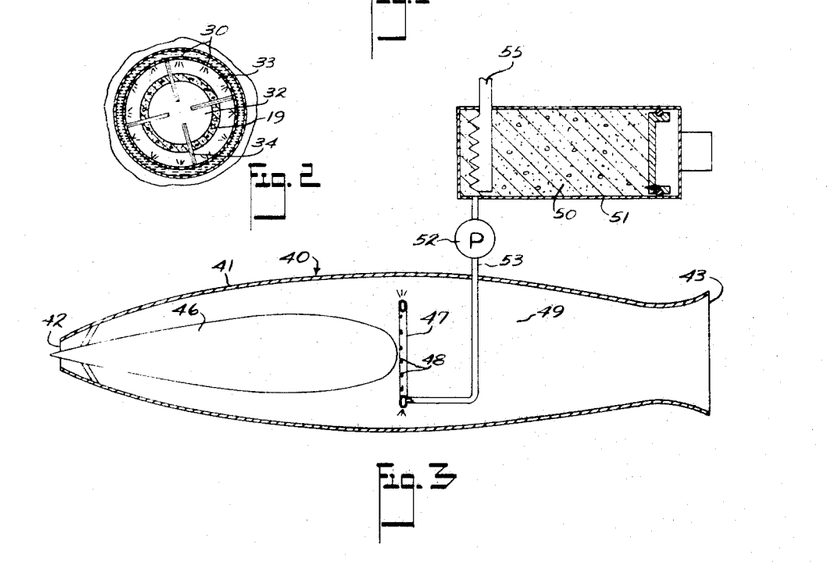
FIG. 2 is a sectional view taken along the lines indicated at 2—2 in FIG. 1.
FIG. 3 is another embodiment of the present invention showing a cross section of a simplified ram-jet engine shows the improved solid fuel of the present invention and means for adaptable for extruding and burning the same in a combustion chamber of a ram-jet engine.

As seen in FIG. 2, the die is in the form of a generally circular shield with a central section 32 and an outer peripheral section 33 which is concentric about the central section 32. The thin sleeve 19 is forced between the sections 32 and 33 to form a thin burning surface just outside the die when contacted by the ClO$_3$F. The center section 32 is held in place by a spider 34.

FIG. 3 shows a ram-jet engine 40 having a steel casing 41 with an inlet opening 42 for air and an outlet opening 43 for the exhaust of combustion products. In this engine, ram-air enters opening 42, passes by a diffuser 46 and flows over a fuel injection means which comprises an annular metal tube 47 with an outer periphery that is generally circular in outline and has a series of fuel injecting openings 48 spaced there around. The injecting means is housed within a combustion chamber 49.

In accordance with the present invention, as seen in FIG. 3, an improved fuel composition 50 having a low melting waxy binder is carried in storage tank 51 and conducted to said injection means by a pump 52 and a conduit 53. The pump 52 can be screw pump, gear pump or other means used to pump highly viscous, yet flowable materials. Particularly outstanding in most applications is a Moyno screw pump in which the smooth surfaces of the screw and the housing around the same are designed to allow the surfaces to flow smoothly or roll along the housing rather than rub against the sides. This type of pump has close dimensional tolerances and reduces any tendency of the semi-solid viscous material to slip or leak back into the storage tank.

As noted in FIG. 3, the fuel may be heated to a more flowable state before pumping by a heating means such as an electric coil 55. In any event, in accordance with one aspect of the present invention, a flowable, fusible fuel containing uniformly suspended exotic metal or metalloid particles and if required, a limited percentage of oxygen carrying particles, is delivered into the combustion chamber and burned therein with a liquid oxidizing agent which is also injected therein to produce a great amount of energy at a usuable, relatively low rate.

Figures 4, 5:
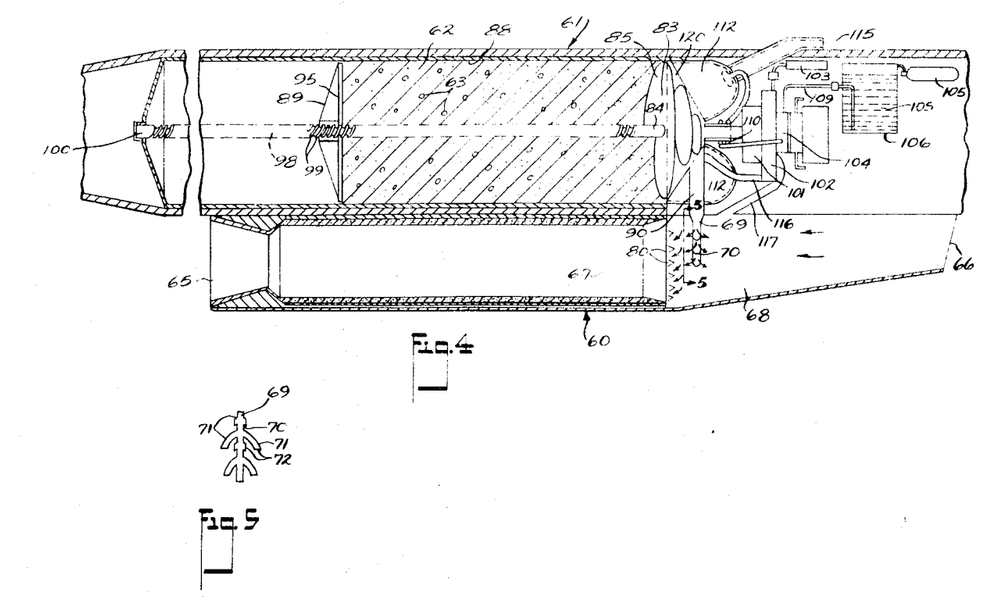
FIG. 4 is a cross sectional view of a complete ram-jet engine and fuel fusing and feed system as part of a missile which in turn carries the improved solid fuel of the present invention within its fuselage.
FIG. 5 is a sectional view taken along the lines indicated at 5—5 in FIG. 4.
Figure 5:
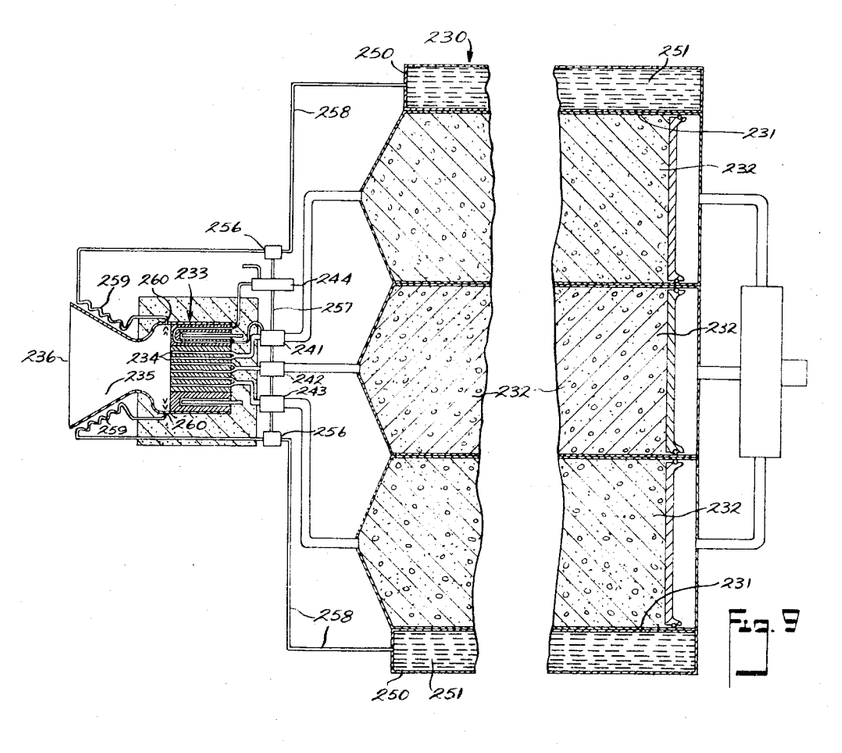

FIG. 4 shows a ram-jet engine 60 which supports a missile 61 which in turn carries a fuel 62 for the engine 60. The engine comprises an exhaust port 65, an inlet 66, a combustion chamber 67 and a forward portion 68 which houses a fuel injection means 69 comprising a central tube 70 with short conduits 71 branching therefrom with fuel discharge openings 72 therein to provide an outline similar to a Christmas tree.

As also shown in FIG. 4, a flame holder 80 is located downstream from the fuel injector 69 and near the juncture of the combustion chamber 67 and the forward portion 68 of the ram-jet engine. The flame holder comprises a series of annular rings which expose the open side of a V-shaped cross section to the front of the flame. Other designs for preventing the flame from traveling back and forth in the air stream can be used as is well known in the ram-jet art.

Means comprising a screw pump 83 having a central shaft 84 and blades 85 is provided for moving the fusible fuel 62 from the storage chamber 88 in said missile 61 with the aid of a piston 89 to the injector means 69. The fuel, which is preferably a high energy releasing metal-containing powder particles 63 such as boron or lithium bound in naphthalene or petroleum jelly, is extruded by the action of the screw driven piston 89 and forced down through delivery tube 90 to the fuel injection means 69. There the fuel is injected into the combustion chamber and burned with ram-air coming into the chamber through the entrance port 66.

In the embodiment shown in FIG. 4, the piston 89 includes a disk 95 of generally circular cross section which is a snug fit inside the chamber 88. The piston disk 95 can move with respect to the walls of chamber 88 but does not rotate therein, it being keyed to the upper wall and held against rotation thereby.

As seen in FIG. 4, a shaft 98 is extended on one end of the central shaft 84 and runs the entire length of the fuel cell. The shaft 98 is provided with threads 99 by virtue of which the piston, being internally threaded, rides forward due to the rotary motion of the shaft 98. The shaft 98 rotates in end bearing 100 and is driven relatively slowly through a gear box 101 by a turbine 102 which rotates at a relatively high rate.

In the embodiment shown in FIG. 4, the missile and ram-jet engine is launched by a solid booster, not shown. Once in flight, the ram-jet engine 60 is started by the simultaneous ignition of a propellant cartridge 103 which starts turbine 102 and the pressurization of a liquid monopropellant 105 such as n-propyl nitrate in a storage chamber 106. The monopropellant 105 is forced through conduit 109 into pump 104 from which it is pumped through exit line and bearing cooling coil 110 then to the propellant injector for burning.

An annular, generally doughnut-shaped auxiliary combustion chamber 112 is provided into which the monopropellant is injected and burned. The monopropellant is further burned with air which enters the combustion chamber 112 through an air scoop 115. The products of combustion pass through feed line 116 into the turbine 102 from where they may be exhausted through conduit 117 into the diffuser just forward of the fuel injectors.

The annular auxiliary combustion chamber 112 has a rearward side wall 120 which is adjacent the front of the fuel slug and which fuses or melts said slug on its forward end by conduction. The fused fuel slug is thus ready for pumping to the fuel injector means.

Figure 6:
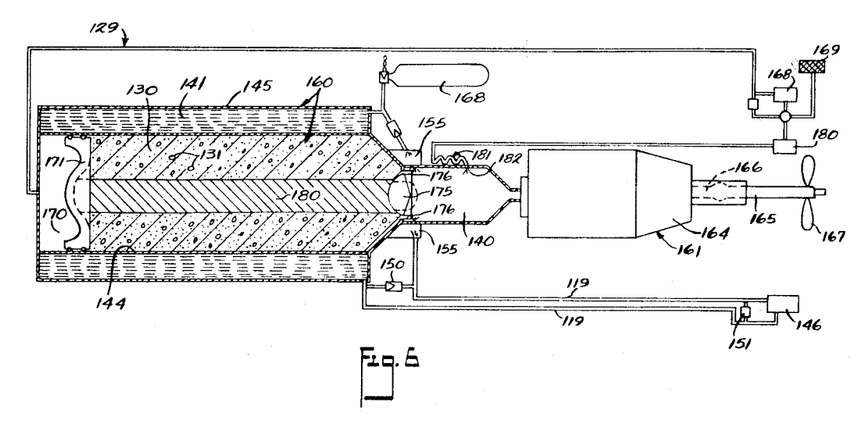
FIG. 6 shows a cross sectional view of a torpedo propulsion system in which the improved solid fuel is effectively utilized by extuding the fuel into a combustion chamber and burning it with decomposed hydrogen peroxide.

FIG. 6 shows the adaptation of a wax-bound metal fuel in a torpedo propulsion system 129. As therein illustrated, a fuel 130 comprising petroleum jelly with finely divided metal particles 131 dispersed uniformly therein utilized to provide a relatively high specific thrust by extruding the fuel 130 into a combustion chamber 140 and burning the same with steam and oxygen which are supplied as decomposition products of hydrogen peroxide and by sea water injection.

The fuel is carried in a fuel storage chamber 144. Liquid hydrogen peroxide 141 is carried in an annular coaxial storage chamber 145 around the fuel chamber 144 and pumped by means of pump 146 through the conduits 119 having a check valve 150 and a by pass throttle valve 151 therein into a decomposing chamber 155 containing a silver catalyst for decomposing the peroxide.

The torpedo generally has three main sections, (1) a fuel carrying section 160 containing the fuel 130 and liquid hydrogen peroxide 141, (2) the combustion chamber 140, and (3) a power section 161 which has a hot gas engine 164 and a hollow shaft 165 with an interior central opening 166 therein running longitudinally the length thereof which serves as hot gas engine exhaust conduit, and the drive shaft for a propeller 167.

In first starting the torpedo, nitrogen, under pressure in a storage chamber 168, is released to apply pressure to the liquid hydrogen peroxide in its storage chamber 145, there previously being no pressure therein greater than atmospheric. The pumps of the torpedo are driven from the engine shaft 165. When pressurized, the peroxide flows via starting valve 150 into the decomposer 155 and is decomposed and injected into the combustion chamber, the engine 164 at this stage being driven by the hydrogen peroxide alone.

As the engine section is operated the shaft 165 is rotated which in turn drives various pumps, etc. One of the pumps, liquid pump 146, begins to deliver hydrogen peroxide to the decomposer chamber 155. Also, a pump 168 is started which takes in sea water at a filter 169 and forces it into a space 170 behind a piston 171 which forces the wax-bound fuel into the combustion chamber 140. The fuel is extruded through a die 175 in the form of a relatively thin sleeve 176 which forms a burning surface which rapidly disperses and mixes when the fuel sleeve combines spontaneously with the decomposition products of hydrogen peroxide.

In the embodiment shown in FIG. 6, the fuel slug has a central cavity running longitudinally along its entire length. A rod 180 or multiple rods of an oxidizer material is disposed in said cavity and is extruded along with the fuel through a central opening in the die to provide additional oxidizer for the sleeve 176 of fusible extruded fuel.

As shown in FIG. 6, the valve 150 which is an electrically operated valve, is provided to get the peroxide to the combustion chamber 140 before the liquid pump is started. After the liquid pump is started, the by pass valve 151 can be used to control the pressure and rate of the hydrogen peroxide being supplied to the combustion chamber. Also as shown in FIG. 6, a third pump takes water from filter 169 and delivers this for combustion chamber regenerative cooling and combustion chamber injection to drop the chamber temperature so that the combustion products can be admitted to the engine 164 at about 2000° F.

Alternatively, the cavity may contain a conventional solid propellant charge in place of rod 180. This is of suitable burning rate and is pressure fed with the fuel into the combustion chamber where it permits fuels containing lithium, magnesium and the hydrides to be burned in steam and water vapor.

Figures 7, 8:
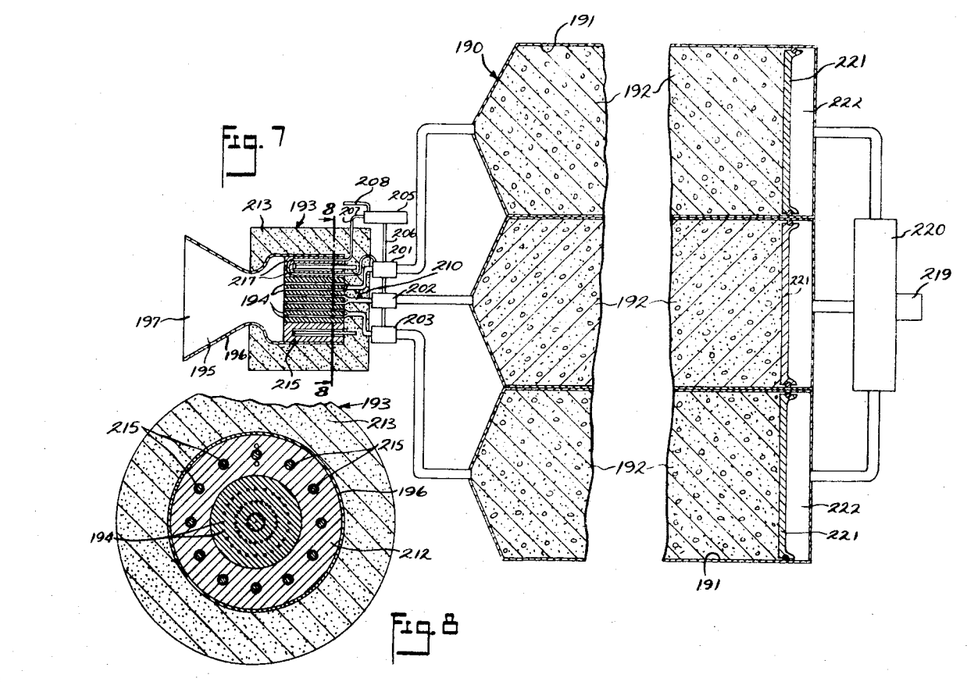
FIG. 7 shows a cross sectional view of a nuclear rocket engine in which the improved solid fuel is utilized by extruding the same into a nuclear reactor where it is vaporized and heated to high temperature in the reactor and then expelled at a nozzle to produce thrust.
FIG. 8 is a sectional view taken along the lines indicated at 8—8 in FIG. 7.

FIG. 7 shows the use of fuel having metal containing particles bound with a low melting waxy material in a nuclear rocket engine 190. The engine 190 comprises a plurality of fuel carrying chambers 191 each of which contains a fuel slug 192. Also shown is a nuclear reactor 193 comprising a plurality of axial tubes 194 with a fissionable material therebetween such as uranium carbide and graphite, a high temperature chamber 195 formed by a continuous wall 196 of a heat resistant material, and an exhaust nozzle 197.

In accordance with the present invention, each of the fuel slugs 192 is a mixture of finely divided lithium hydride particles and petroleum jelly, the lithium hydride particles being uniformly dispersed therein. The binder, again, is an easily pumpable, extrudable waxy material and the fuel particles can be lithium, or even a heavier metal such as cesium for some application. Also, the fuel particles may be amine or ammonium compounds, these fuels being hydrogen rich good conductors of heat from the nuclear material and at the same time being readily vaporized and superheated to provide energy for propulsion.

In the embodiment shown in FIG. 7, multiple pumps 201, 202 and 203 extrude the fuel composition from the storage chamber 191 into the nuclear reactor 193. After the engine reactor has been started, the pumps are driven by a turbine 205 through its shaft 206. The turbine 205 is started by means not shown and driven by hot reactor vaporized fuel gases entering it by line 207 and line 208 exhausting therefrom. The fuel is pumped through feed lines 210 into the reactor heat exchange tubes 194. The fuel is vaporized, decomposed and superheated in the tubes and the vaporized fuel products pass through the high temperature chamber 195 and out exhaust nozzle 197 to provide a large thrust for propulsion.

As shown in both FIGS. 7 and 8, the nuclear engine has a dense compact reflector shell 212 of beryllium around the nuclear reactor to reflect neutrons back into the active core. An outer jacket 213 of beryllium sponge is provided around the reflector shell 212 to further prevent neutrons from escaping the reaction area.

A plurality of boron control rods 215 are provided in the reflector shell 212. When operating the engine, most of the rods are withdrawn to start the engine, the remaining few rods being withdrawn just before the rocket is launched. As fuel is first fed into the tubes 194 to be vaporized, fuel is also fed into loop 217 where it is vaporized and passed through line 207 to drive the turbine 205.

Also when first starting the rocket engine, a booster charge 219 is burned to build up pressure in the neighborhood of 5000 p.s.i. in a pressure chamber 220. A plurality of pistons 221 are provided at the forward end of each of the fuel chambers 191 to help extrude the fuel into the nuclear reactor. If the pressure in chamber 220 is around 5000 p.s.i. the pressure in the chambers 222, behind each of the pistons, is much less, being only generally about 100 p.s.i., but it is enough to help push the wax-bound fuel into the pumps and into the nuclear reactor.

Thus according to the present invention, a fuel comprising solid fuel particles such as ammonium and amine compounds including ammonium nitrate, urea nitrate, and ethylene diamine and preferably particles of lithium and lithium hydride of a size preferably less than 325 mesh or better 400 mesh and in the range of an average particle size of about 5 to 40 microns, is advantageously used in a nuclear rocket engine, where it is vaporized and superheated to provide great energy for propulsion.

Since, generally it is difficult to maintain the nuclear reactor at a temperature desired say of 2000° C. or higher, the combination of vaporizing a fuel and also after burning some of the vaporized products is advantageous used when the reactor can be maintained only at lower temperature, say of 1000 to 1200° C. A nuclear chemical hybrid rocket engine 230 is shown in FIG. 9. The engine 230 has nearly the same structure as the nuclear rocket engine 190 of FIG. 7. Thus, the engine 230 has a plurality of fuel carrying chambers 231, each containing a fuel slug 232 therein, a nuclear reactor 233 comprising a plurality of co-axial tubes 234, a high temperature chamber 235 and an exhaust nozzle 236. In addition the engine 230 also has a plurality of pumps 241, 242 and 243 and a turbine 244 for pumping the fuel into the reactor 233.

An annular chamber jacket 250 is provided around the fuel chamber 231, the jacket containing a liquid oxidizer 251 such as water. The water is delivered by a set of pumps 256 which are driven by common turbine shaft 257 to the high temperature chamber 235 at a point rearwardly of the nuclear reactor 233 through conduit lines 258 and injected after serving as a coolant in cooling loop portion 259 into said chamber 235 at injection point 260 for reaction therewith the vaporized products from the reactor 233 to provide additional power by afterburning. When the fuel slug comprises 80 parts by weight of finely divided lithium hydride particles and 20 parts by weight of petroleum jelly, lithium ions are produced by vaporization of the lithium hydride in the reactor 233. The water then combines with the lithium radicals to form lithium oxide and release a very large quantity of energy which is exhausted along with the other dissociation and combustion products out the nozzle 236 to product thrust.

In the embodiment shown in FIG. 9 as in the case of the engine shown in FIG. 7, the fuel slug 232 is extruded into the nuclear reactor 233 by means of pumps 241, etc. where the fuel and binder material are dissociated to provide a large amount of energy for propulsion. A plurality of pistons 277 are also provided to force the fuel slug, which is preferably heated in its portion adjacent the pumps from the heat of the reactor 253, toward the pumps.

Thus, the engines of FIGS. 7 and 9 illustrate the use of fuels bound with low melting waxy materials in which the fuels are extruded into a chamber for vaporization to provide a high amount of energy for propulsion.

The following examples illustrate the use of the solid fuels on the methods and apparatus used to burn the same according to the present invention.

EXAMPLE I

A solid fuel for pressure injection into a combustion chamber was prepared by mixing under vacuum 30 parts by weight petroleum jelly with 70 parts by weight of finely divided (200 mesh to 325 mesh) boron powder along with about 10 parts by weight of R.D.X. (trinitro trimethylenetriamine). The metal particles were added to the petroleum jelly and suspended therein. Then the R.D.X. explosive particles were added and suspended.

Organic fusible solid binders and stabilizers

The present invention relates to a solid of semi-solid fuel and a method and apparatus for utilizing the same for propulsion. More particularly, the present invention relates to a solid or semi-solid fuel and a method of burning a solid or semi-solid fuel for rocket, ram-jet, and torpedo propulsion applications in which said fuel preferably is injected or extruded into a combustion chamber, and burned therein with oxygen or fluorine or other well known oxidizers and even steam to provide an improved means of propelling a vehicle.

In the past, propulsion systems have been used in which a metal fuel such as aluminum powder was suspended in gasoline, kerosene or other organic liquids to form slurries for burning with liquid oxygen or fluorine in a combustion chamber. Such systems have suffered from the drawback of having the aluminum particles separate out from the kerosene even when large amounts of a stabilizer such as Napalm type gelling agent were added.

Further, the addition of the Napalm type gelling agent is undesirable because the resultant gels are not as stable as desired and generally must be formed at the site shortly before using the same. The Napalm type gels also provide the fuel with an energy penalty inasmuch as the metal sodium does not add to the total energy obtained from combustion of the fuel.

While metal fuels such as aluminum and lithium powders suspended in kerosene are readily burned with liquid oxygen or burned in air in an after burner of a ram-jet engine such as shown in FIG. 3. The fuel was preheated to change it to a less viscous form and pumped into the combustion chamber where it was injected and burned to provide an excellent fuel.

Other waxy binders herein described may be substituted in whole or part for the petroleum jelly or paraffin wax used as the binders in the above described examples. In a similar manner, other finely divided metal and metalloid particles as previously described can be substituted in whole or part for the boron powder and the decaborane used in the above examples. The R.D.X. combustion agent used to combine with the fuel in Example I may be substituted in whole or part by other previously described combustion agents and ignition sensitizers. Likewise, other oxygen and fluorine containing materials, as is well known in the art, can be used to burn the described fuels.

In addition, other means of extruding, injecting, or otherwise forcing the wax-bound fuel into the combustion chamber can be used as previously discussed.

What is claimed is:

1. An extrudable solid fuel composition comprising finely-divided metal-containing fuel particles and oxidizer particles in which said oxidizer particles are covered with a thin tough plastic film to prevent their premature reaction with said fuel particles, and said fuel particles and said oxidizer particles dispersed in a low melting waxy binder.

2. An extrudable solid fuel composition comprising finely-divided metal-containing fuel particles and oxidizer particles in which said oxidizer and said fuel particles are covered with a thin tough plastic film to prevent their premature reaction, and said fuel particles and said oxidizer particles dispersed in a low melting waxy binder.

(References on following page)

References Cited

UNITED STATES PATENTS

| | | | |
|---|---|---|---|
| 2,211,738 | 8/1940 | Cairns | 149—7 |
| 2,982,640 | 5/1961 | Blake | 149—11 X |
| 3,032,449 | 5/1962 | Fox et al. | 149—4 |
| 3,138,496 | 6/1964 | Monical | 149—11 |
| 3,373,062 | 3/1968 | Morris | 149—19 X |
| 3,377,955 | 4/1968 | Hodgson | 149—19 X |
| 3,388,554 | 6/1968 | Hodgson | 149—92 X |
| 3,395,055 | 7/1968 | Sparks et al. | 149—19 X |
| 3,440,115 | 4/1969 | Falterman | 149—4 |
| 3,414,443 | 12/1968 | Pheasant et al. | 149—18 X |

BENJAMIN R. PADGETT, Primary Examiner

S. J. LECHERT, Assistant Examiner

U.S. Cl. X.R.

149—4, 7, 11, 18, 19, 20, 22, 36, 37, 92